United States Patent [19]
Whitney

[11] 3,711,648
[45] Jan. 16, 1973

[54] COMMUNICATION SYSTEM PROVIDING COMBINED AUDIO-VIDEO SERVICE

[76] Inventor: Wiley Whitney, 2829 N.E. 33rd Court, Apt. 603, Fort Lauderdale, Fla. 33306

[22] Filed: June 1, 1971

[21] Appl. No.: 148,637

[52] U.S. Cl. ............................................... 179/2 TV
[51] Int. Cl. ............................................... H04m 11/08
[58] Field of Search .............. 179/2 TV; 178/DIG. 13

[56] References Cited

UNITED STATES PATENTS 3,612,767 10/1971 Anderson ........................... 179/2 TV
3,617,637 11/1971 Gorman ............................. 179/2 TV
3,649,761 3/1972 Bush ................................. 179/2 TV

*Primary Examiner*—Ralph D. Blakeslee
*Assistant Examiner*—Thomas D'Amico
*Attorney*—Ivan A. McCorkendale

[57] ABSTRACT

A communication system for combined audio-video service utilizes at the subscriber's station two separate line circuits, one being the normal audio-only line to the telephone central office and the other, a special six-wire line, extending from the premises to a video switching network and providing both audio and video signals and transmission on all audio-video calls both incoming and outgoing. The video switching network provides switching facilities for combined audio-video calls exclusively for combined service subscribers in the area.

9 Claims, 3 Drawing Figures

INVENTOR
WILEY WHITNEY
BY [signature]
ATTORNEY

INVENTOR
WILEY WHITNEY
BY J. R. McCorkendale
ATTORNEY

COMMUNICATION SYSTEM PROVIDING COMBINED AUDIO-VIDEO SERVICE

My invention relates to a communication system and, more particularly, to a communication system providing combined audio-video service.

BACKGROUND OF THE INVENTION

Down through the years, it has been recognized that in the instance of telephone communication, excellent and essential though it may be, one thing has been lacking, namely "face to face" viewing. Persons concerned with communication have long agreed that the value of voice communication, even when of the highest attainable efficiency, would be vastly enhanced if the talkers could "see" each other and be able to observe the "silent" responses from time to time such as a smile, a grimmace, a shrug, or the like. Then we would have true simulation of an actual personal meeting.

With such realization, there has recently been made available to certain Bell System subscribers on a limited basis a combined audio-video service whereby a television-type picture is provided of the person to whom the subscriber is talking. This service is described, for example, in Bell Laboratories Record, Vol. 47, No. 5, May-June 1969, published by Bell Telephone Laboratories, Incorporated, Mountain Avenue, Murray Hill, New Jersey 07974.

The consistent demand for combined audio-video service which has long existed in a somewhat dormant condition among telephone subscribers generally has, of course, been awakened and magnified by publicity accompanying introduction of the new audio-video service referred to above. However, due at least in part to the particular design of the video switching means selected, this service is now available only to those Bell System subscribers who are served by certain types of telephone switching systems. Accordingly, the demand for audio-video service by subscribers served by most Independent Telephone Companies and, indeed, by many Bell System subscribers is not presently met by the new service referred to above.

Accordingly, it is an object of my invention to improve combined audio-video communication systems.

A more specific object of my invention is to make combined audio-video service available to all subscribers without regard to the particular type of telephone switching system by which they are served.

BRIEF DESCRIPTION OF THE INVENTION

In accordance with a specific illustrative embodiment of my invention, a communication system providing combined audio-video service to selected subscribers utilizes two separate line circuits for each subscriber. One of these lines is the normal audio line to the telephone central office, while the other is a special six-wire line extending from the subscriber's premises to a centrally located video switching network. The second line provides both audio and video signals and transmission on all combined audio-video calls both incoming and outgoing. The video switching network is used exclusively for combined audio-video calls and provides full switching facilities for such calls for combined service subscribers in the area.

The two separate lines are connected at the subscriber's station to a two-line key system subscriber's set, the Line 1 key being used for all audio-only calls and the Line 2 key being used for all combined audio-video calls. Only one of the two keys can remain operated at a time, operation of the first key releasing the second key and vice versa. There are also located at the subscriber's station a suitable audio-video set or display unit including a picture tube, a camera tube and a loudspeaker, a control unit and microphone, the latter being mounted within the housing of the control unit if desired. In addition, a service unit containing power supply, logic circuits, set control means, and transmission circuits is located at some convenient spot in the station area.

A feature of my invention is a video switching unit which functions to provide full switching control of the combined audio-video calls entirely independently of control by the telephone switching system.

A further feature of the invention is separate line circuits for audio-only calls and for combined audio-video calls whereby the need for a special video call signal to the subscriber is eliminated together with any requirement of separate directory numbers for the audio-only and combined audio-video services respectively.

A still further feature of the invention is a specially arranged number group translator particularly applicable to situations where, as in the combined audio-video service, there are a large number of possible inputs and a relatively small fixed number of outputs.

BRIEF DESCRIPTION OF THE DRAWING

A full understanding of the arrangement contemplated by the present invention as well as an appreciation of the various advantageous features thereof may be gained from consideration of the following detailed description in connection with the accompanying drawing in which.

DETAILED DESCRIPTION OF THE INVENTION

Figure 1:
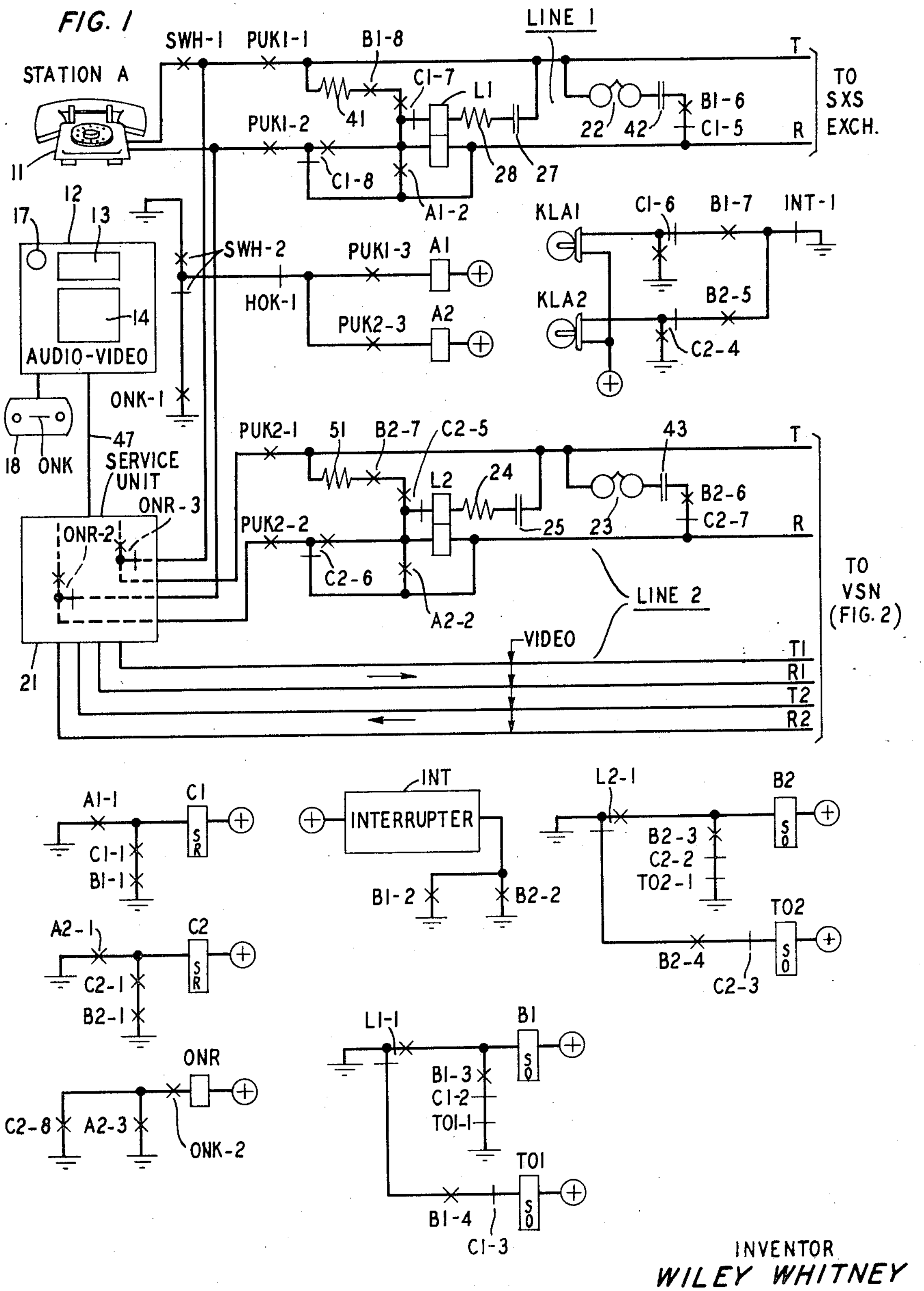
FIG. 1 shows schematically the circuitry at the subscriber's station for a combined audio-video communication system as contemplated by a specific illustrative embodiment of my invention.

In the drawing the circuits illustrated are arranged in the so-called "detached contact" type of representation wherein, generally speaking, relay contacts are shown separated from the relay winding which controls the respective contact. This type of disclosure permits functional groups of circuitry to be shown separately thus facilitating an understanding of the operational features involved. Each contact designation includes identification of the controlling relay winding, for example, the designation "C2–4" refers to contact No. 4 of relay C2. In accord with usual circuit design transfer contacts may be either Early Make-Break (continuity) or Early Break-Make (sequence transfer) as dictated by the particular operational requirements.

Referring now to FIG. 1, there is shown schematically the circuitry at a combined audio-video subscriber's station "A" as contemplated by a specific illustrative embodiment of the invention. Two telephone sets are provided at the station, one, set 11, the normal substation set with dial or other suitable call transmitter and the second, set 12, the combined audio-video set; set 12 may be of any suitable, compact design and includes a camera tube 13 for pick-up, picture tube 14 for display, and loud speaker 17. A suitable pick-up microphone is also provided and may, if desired, be mounted within the housing of control unit 18.

As shown, two separate lines are provided, set 11 being connected to the normal telephone switching exchange by the usual two-wire line, "Line No. 1", and audio-video set 12 being connected to the Video Switching Network by a special six-wire line, "Line No. 2." Line No. 1 is used for all normal (i.e. non-video) calls as usual, while Line No. 2 is used for, and only for, combined audio-video calls. Both lines are connected to service unit 21 which contains the necessary power supply, logic circuits and transmission circuits. Service unit 21 will not be described in detail in order to avoid undue length and complication of the specification since the component elements may be of a nature well understood in the art; the service unit can be located in any convenient area at, or near, the station.

The two lines are connected to a combination of two line pick-up keys, key PUK1 being associated with Line No. 1 and used on all non-video calls, and key PUK2 being associated with Line No. 2 and used on all audio-video calls. The two keys are mechanically connected in such a manner that only one of the keys can remain in operated condition at a time; operation of key PUK1 will release key PUK2 and vice versa. A separate ringer is provided for each line, ringer 22 being connected across Line No. 1 and ringer 23 being connected across Line No. 2. Also, separate key lamps are provided, lamp KLA1 being associated with Line No. 1 and key PUK1, and lamp KLA2 being associated with Line No. 2 and key PUK2.

An ON control key, ONK, is provided in association with the combined audio-video set 12, preferably being mounted in the housing of control unit 18 as shown. Operation of this key is effective to close paths for energizing the electronic elements of combined set 12 and also to partially close at make contact ONK–1 one of the operating paths for relays A1 and A2, and to partially close at make contact ONK–2 the operating path of ON relay ONR. While, as stated, operation of key ONK is effective to turn set 12 on, the set is not actually connected through service unit 21 to Line 2 until ON relay ONR has been operated. Transfer contact pairs ONR–2 and ONR–3 of relay ONR are included in service unit 21 and function, when the relay is non-operated, to connect telephone set 11 through to the audio path of Line 2, and function, when the relay is operated, to disconnect telephone set 11 from Line 2 and to connect audio-video set 12 to Line 2. This novel connecting means is provided so that the dial or other digit pulsing means provided at telephone set 11 can be utilized on occasion for pulsing over Line 2 when an outgoing combined audio-video call is being initiated over that line at Station A.

Line relay L1 is associated with Line 1, the upper winding being connected in series with a ringing current path and the lower winding being connected in series with the ring (R) side of the line; line relay L2 is associated with Line 2 and similarly connected.

In order to further describe the arrangement of the specific illustrative embodiment of the invention, it will be assumed, first that an incoming call to station 11 is being received over Line 1 from the SXS exchange, that is a non-video call. Relay L1 will follow the ringing current applied through capacitor 27, resistor 28, upper winding of relay L1, break contact of transfer pair C1–7 to the other side of the line and through the lower winding of the relay. After a predetermined delay, slow-operate relay B1 operates from ground, make contact of transfer pair L1–1 to battery and, upon operating, locks to ground through its make contact B1–3 and break contacts C1–2 and TO1–1 to ground. Relay B1, operated, also partially completes at make contact B1–8 a holding path for relay L1 through resistor 41, and partially closes at make contact B1–1 a future holding path for relay C1. Additionally, relay B1 operated closes at make contact B1–2 an activating path for interrupter 1NT whereby to "flash" lamp KLA1 associated with set 11 over a path from ground, interrupter contact 1NT–1, make contact B1–7, break contact of transfer pair C1–6, lamp KLA1 to battery.

Ringer 22 is activated by the incoming ringing current applied through capacitor 42, make contact B1–6 and break contact C1–5, and the ringing, together with flashing lamp KLA1, signals the presence of an incoming call on Line No. 1. At this time, an operate path for time out relay TO1 is closed at make contact B1–4; relay TO1 is slow-to-operate, however, and does not operate on the normal ringing cycle.

In the event the calling party abandons the call, for example if the subscriber at station A fails to answer, relay L1 releases when the calling party goes on-hook and, after a predetermined delay, for example 10 seconds, relay TO1 operates from ground, break contact of transfer pair L1–1, make contact B1–4, break contact C1–3, relay winding to battery.

Relay TO1, operated, opens the hold path of relay B1 at break contact TO1–1 and relay B1 releases. Relay B1, released, opens the future hold path of relay L1 at make contact B1–8, opens at make contact B1–1 the future locking path for relay C1, opens its own locking path at make contact B1–3, opens at make contact B1–2 the activating path of interrupter 1NT, interrupts at make contact B1–7 the energizing path for lamp KLA1, interrupts at make contact B1–6 the path through ringer 22 and, finally, opens at make contact B1–4 the operate path for relay TO1. Circuits associated with subscriber's set 11 are accordingly restored to normal.

In the instance of a call incoming on Line 2 from the video switching network, that is a combined audio-video call, the preliminary circuit operations are generally similar to those just described for Line No. 1. Relay L2 follows the ringing, and relay B2 operates from the make contact of transfer pair L2–1 and locks to ground through its make contact B2–3. A path is closed at make contact B2–6 connecting ringer 23 across Line No. 2, capacitor 43 being included in this path, an energizing path is closed at make contact B2–2 for interrupter 1NT and lamp KLA2 flashes over a path closed at make contact B2–5.

As in the previously described situation, should the calling party abandon the call before answer by the subscriber at station A, relay TO2 will operate after a 10 second delay and the circuits will restore to normal.

For purposes of further description, it will be assumed now that in each of the above instances, the called subscriber at station A responds by going off-hook while the calling party is still on the line. First with regard to a call incoming on Line 1, the subscriber responds to the signal by ringer 22 and flashing lamp KLA1 by going off-hook and by closing pick-up key PUK1. (In the event that pick-up key PUK2 is in operated position at this time, it will be released when key PUK1 is operated.) The line loop at subscriber's set 11 is now closed at make contact SWH–1 of the telephone set, make contact PUK1–2 and break contact of transfer pair C1–8, and relay A1 operates from ground, make contact of transfer pair SWH–2 of the telephone set, break contact HOK–1 of the HOLD key, make contact PUK1–3 of the pick-up key, relay winding to battery. Relay A1, operated, closes at make contact A1–2 a shunting path for the lower winding of relay L1 which releases (assuming that relay L1 was in operated condition at this time).

Relay C1 now operates from ground through make contact A1–1 and this is followed by release of relay B1 since the hold path is opened at break contact C1–2. Relay C1, operated, also opens at the break contact of transfer pair C1–7 the ringing current operate path through the upper winding of relay L1, partially closes at make contact C1–1 a future hold path for its own winding, interrupts at break contact C1–3 the operate path of relay TO1, partially closes at the make contact of transfer pair C1–7 a future hold path for relay L1 through resistor 41, closes at the make contact of transfer pair C1–8 the talking path for set 11 and trips the ringing at the central office, closes at the make contact of transfer pair C1–6 a path to ground whereby to change lamp KLA1 from "flashing" to "steady", and opens at break contact C1–5 the path through ringer 22.

Relay B1, released as above described, opens at make contact B1–7 the "flash" path for lamp KLA1, opens at make contact B1–6 the path through ringer 22, opens at respective make contacts B1–1 and B1–4 the locking path for relay C1 and the operate path for relay TO1, and opens at make contact B1–2 the energizing path for interrupter INT. Conversation can now take place between the subscriber at set 11 of Station A and the calling subscriber.

Considering now for the moment the incoming call from the video switching unit on Line 2 referred to above, it will be assumed that the call is answered by the subscriber at station A while the calling party is still on the line. The subscriber at station A responds to the signal of ringer 23 and flashing lamp KLA2 by closing pick-up key PUK2 and by either going off-hook or by closing audio-video control key ONK (Pick-up key PUK1, if closed, will be released by operation of key PUK2). Relay A2 now operates from ground (either at the make contact of transfer pair SWH–2 or at make contact ONK–1 of key ONK depending upon the action of the subscriber), through make contact PUK2–3, winding of relay to battery. Assuming that the subscriber had answered the call by going off-hook, he would ordinarily at this point close the ONK key whereby to turn on combined audio-video set 12. Relay A2 being operated as just described, relay ONR now operates from ground, make contacts A2–3 and ONK–2, relay winding to battery. Accordingly, the combined set 12 is now connected via suitable cable 47 to the service unit 21 and through the circuit elements of the service unit to Line 2. Tip (T) and ring (R) connections are closed at make contacts of the respective transfer pairs ONR–3 and ONR–2, the telephone set 11 connection being opened at the break contacts of these same transfer pairs. With pick-up key PUK2 closed, set 12 is now connected through to the T–R pair of Line 2.

Relay A2, operated, also closes at make contact A2–2 a shunting path for the lower winding of relay L2 and that relay, if in operated position, releases. Also, relay A2 operated closes at make contact A2–1 an operate path for relay C2; operation of relay C2 is followed by release of relay B2 as the locking path is opened at break contact C2–2. Also, relay C2 operated interrupts at the break contact of transfer pair C2–5 the ringing current path through the upper winding of relay L2, opens at break contact C2–7 the energizing path for ringer 23, partially closes at make contact C2–1 a future holding path for its own winding, partially closes at the make contact of transfer pair C2–5 a future hold path for relay L2, interrupts at break contact C2–3 the operate path of relay TO2, completes at the make contact of transfer pair C2–6 a talking path between audio-video set 12 and the video switching network and trips the ringing at the calling end, closes at make contact C2–8 an auxiliary path for holding relay ONR operated and set 12 connected through to Line 2 on occasions when relay A2 may be released, and closes at the make contact of transfer pair C2–4 a path to ground for changing lamp KLA2 from "flashing" to "steady".

Relay B2, released as above described, opens at make contact B2–5 the "flash" path of lamp KLA2, opens at make contact B2–2 the activating path of interrupter INT, opens at make contact B2–6 the path connecting ringer 23 across Line 2, opens at make contact B2–4 the operate path of relay TO2, opens at make contact B2–7 the future HOLD path through resistor 51 for relay L2, and opens at make contact B2–1 the locking path for relay C2 and at make contact B2–4 the operate path of relay TO2.

Audio-video set 12 is now conditioned for transmission over the T–R pair to the video switching network of audio signals from the microphone associated with combined set 12, here assumed to be mounted within the housing of control unit 18, and to receive over the same pair audio signals from the video switching unit. Also, pictures from camera tube 13 are transmitted over the T1–R1 pair to the video switching network and pictures transmitted from the video switching network are received over the T2–R2 pair and displayed on display tube 14.

Considering now calls outgoing from Station A, it will be assumed first that the subscriber goes off-hook at telephone set 11 in order to initiate an outgoing audio-only call over Line 1 through the step-by-step telephone exchange with which he is associated. In addition to going off-hook, he also closes pick-up key PUK1 and this is followed by operation of relay A1 from ground, make contact of transfer pair SWH–2, break contact HOK–1 of the HOLD key, make contact PUK1–3, relay winding to battery. Relay A1, operated, closes at make contact A1–1 an operate path for relay C1.

The tip (T) side of Line 1 is now closed through at make contacts SWH–1 and PUK1–1 and the ring (R) side is closed through at make contact PUK1–2, make contact of transfer pair C1–8 and make contact A1–2 whereby supervisory and talking paths are closed through to the SXS exchange; it will be assumed that the SXS exchange is of the usual arrangement and operates in the standard manner, and it will not therefore be described in detail.

Relay L1 does not operate at this time as the lower winding is shunted by a path closed at make contact A1–2. With relay C1 operated as above described, the ringing current operate path of relay L1 is opened at the break contact of transfer pair C1–7 while a future HOLD path is partially closed at the make contact of the same transfer pair. A path is closed at the make contact of transfer pair C1–6 for lighting lamp KLA1 "-steady," the operate path of relay TO1 is opened at break contact C1–3 and the locking path of relay B1 is opened at break contact C1–2. Additionally, a future locking path for relay C1, itself, is closed at its make contact C1–1 and the path through ringer 22 is opened at break contact C1–5.

Normal audio-only communication now takes place between station A and the called station reached through the SXS exchange.

Assuming now that the subscriber at Station A wishes to initiate an audio-video call outgoing over Line 2, he will accordingly go off-hook at set 11 and will close pick-up key PUK2. It will be noted that the subscriber does not initiate the call by closing ON key ONK at this point since it is desirable to maintain a connection between set 11 and the audio path of Line 2 in order that the dialing means provided at set 11 can be used for transmitting the desired number. After completion of dialing, key ONK will then ordinarily be closed to activate audio-video set 12. For the present, set 11 is connected to the tip (T) and ring (R) pair of Line 2 via the break contacts of transfer pairs ONR–3 and ONR–2 of relay ONR, the operation of which relay is controlled in part by key ONK.

Relay A2 operates from ground at the make contact of transfer pair SWH–2 of the telephone set, break contact HOK–1 of the HOLD key, make contact PUK2–3, winding of relay A2 to battery. The lower winding of relay L2 is shunted by a path closed at make contact A2–2 and the relay does not operate at this time.

Following operation of relay A2, as described above, relay C2 operates from ground at make contact A2–1. Relay C2, operated, opens at the break contact of transfer pair C2–5 the ringing current operate path of relay L2 and partially closes at the make contact of the same transfer pair of future HOLD path for the relay. Also, relay C2 operated closes a path to ground at the make contact of transfer pair C2–4 for lighting lamp KLA2 "steady," opens at break contact C2–3 the operate path of relay TO2, opens at break contact C2–2 the locking path of relay B2, partially closes at make contact C2–8 an auxiliary operate path for relay ONR, which relay when operated connects set 12 to Line 2, partially closes at make contact C2–1 its own future locking path, and interrupts at break contact C2–7 the path through ringer 23.

Following receipt of dial tone from the video switching network, the operation of which is described immediately below, the subscriber proceeds to operate the dial of set 11 to transmit to the video switching network the directory number of the called audio-video subscriber. Upon completion of dialing, the subscriber closes ON key ONK whereby to activate audio-video set 12. Relay ONR now operates via make contacts ONK–2 and A2–3 (relay A2 having previously operated) whereby the audio and supervisory path for set 12 is now closed through the make contacts of transfer pairs ONR–3 and ONR–2 and make contact PUK2–1 on the tip (T) side and make contact PUK2–2, make contact of transfer pair C2–6 and make contact A2–2 on the ring (R) side to the video switching network, while the video path for sending and receiving pictures is closed through to the network over pairs T1–R1 and T2–R2.

Figure 2:
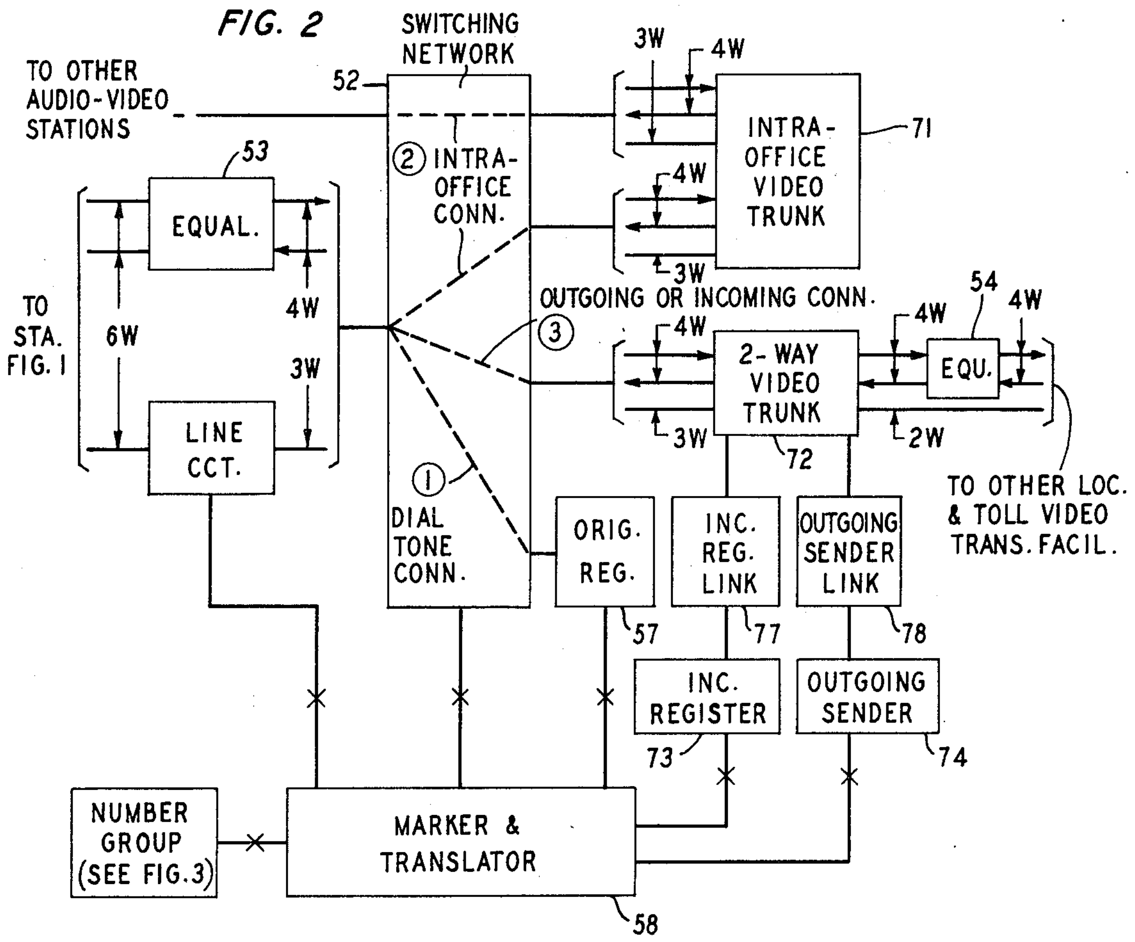
FIG. 2 shows schematically the video switching network.

Referring now to operation of the video switching network associated with Line No. 2, switching network 52 (FIG. 2) is here assumed to be basically similar to No. 5 crossbar, a system well known in the art. However, any type of switching system (electromechanical or electronic) can be utilized so long as the necessary functions, now to be described, are provided. The important unique feature is that the switching network is self-contained, handles only the combined audio-video calls, and operates entirely free of control by any type of telephone exchange equipment. This means, of course, that the service can be extended to any customer desiring it regardless of the type of telephone service provided in the area. As a matter of fact, it is not even required that the audio-video service be provided by an existing telephone Operating Company; the service could be provided by an independent communications organization specializing in furnishing audio-video telephone service alone.

Among earlier issued United States patents disclosing basic features of the crossbar system are U.S. Pat. No. 2,585,904 issued Feb. 19, 1952 to A. J. Busch; U.S. Pat. No. 2,904,637 issued Sept. 15, 1959 to R. D. Williams; and U.S. Pat. No. 3,394,232 issued July 23, 1968 to R. J. Jaeger Jr. et. al.

For purposes of simplification, the paths established by switching network 52 are indicated simply by numbered dotted lines; thus the dial tone connection path ①, the intra-office connection path ②, and the outgoing or incoming connection path ③. Equalizers, as equalizers 53 and 54, may be placed at intervals in the line incoming to the switching network and in the two-way video trunks for maintaining transmission of the necessary high quality; wide band amplifiers and other transmission elements may also be provided as required.

Originating register 57 associated with video switching network 52 returns dial tone to the calling audio-video subscriber who then proceeds to dial or key the number of the called audio-video subscriber. This information is passed along by the originating register 57 to marker 58 which then proceeds to set up the connection. The connection may be completed either via intra-office video trunk 71 to another audio-video subscriber served by the same video switching network 52, or via two-way video trunk 72 to any other audio-video subscriber served by a connecting video switching network or a toll video network. Incoming register 73 and outgoing sender 74 with associated link circuits 77 and 78, respectively, serve their normal functions in connection with the second type of call in the general manner discussed, for example, in the A. J. Busch U.S. Pat. No. 2,585,904 mentioned above.

The novel arrangement contemplated by the invention is such that the subscriber at station A may be assigned the same directory number for all incoming calls, that is both the normal audio-only calls incoming on Line 1 and the audio-video calls incoming on Line 2. Thus he may continue to use his present directory number when the combined audio-video facility is provided. The indication at the calling end as to the type of call being initiated determines entirely the routing of the call. There is no need for interchange of "busy" between the two switching systems involved, i.e., the exchange serving Line No. 1 and the switching network serving Line No. 2, since simultaneous calls can be established to both lines. In a manner described in detail subsequently, the HOLD key provided is used for answering both calls simultaneously, one call being held while talking on the other.

Figure 3:
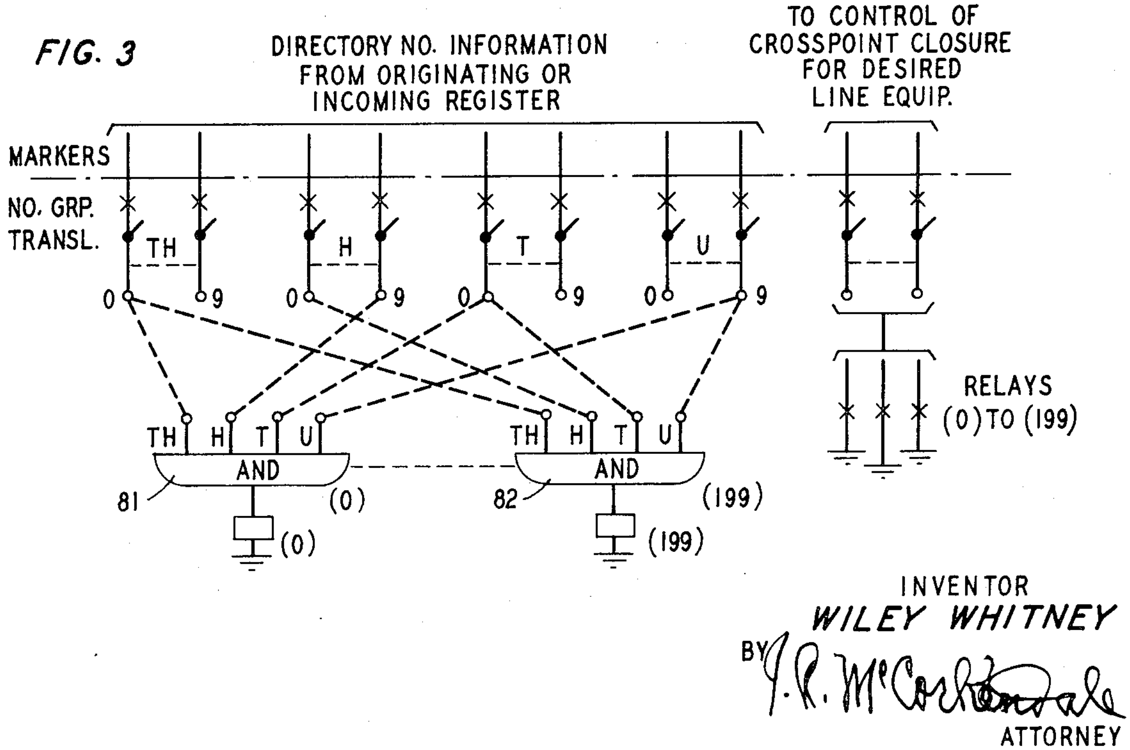
FIG. 3 shows schematically a number group translator for use with the video switching network.

Referring for the moment to FIG. 3, the novel number group arrangement contemplated for use with the audio-video service is shown. While providing the capability that any directory in the area may be given audio-video service, the arrangement is based on the premise that only a relatively few of the large group of subscribers would actually desire the service. The number of cross-connections therefore is relatively small. In the illustrated situations two 4-wire cross-connections are indicated, one, the directory number "0909" to equipment location "0" and the other, directory number "0009" to equipment location "199." An AND gage, an electronic type of device well known in the art, as AND gates 81 and 82, is provided for each assigned audio-video line. It will be noted that the novel arrangement provides a fixed number of outputs (one for each assigned audio-video line) and cross-connectable inputs rather than a fixed number of inputs with cross-connectable outputs as found in prior arrangements. Obviously, the present novel arrangement provides important advantages in situations where a new auxiliary service such as audio-video service has just been introduced and there are a large number of different possible inputs (all directory numbers) and a relatively small fixed number of outputs (actual customers of the new service).

It will be understood, and is so indicated in the drawing, that make contacts of the respective relays 0 to 199 function, when a particular relay is operated through the associated AND gate, to close a path for causing closure of switch crosspoints corresponding to the desired line equipment.

There will now be considered the HOLD feature which, as previously mentioned, permits handling of simultaneous calls incoming on Lines 1 and 2, one call being held while the second is responded to by talking. It will be assumed first that there is an incoming call on Line 1 and the subscriber has gone off-hook at station A and has closed pick-up key PUK1. Relays A1 and C1 are presumed to be operated over paths previously described. Now in order to hold the call, the subscriber at station A operates the HOLD key and this is followed by release of relay A1 as the operate path is open at break contact HOK–1 of the HOLD key.

With relay A1 released, the path shunting the lower winding of relay L1 is open at make contact A1–2 and relay L1 operates over the tip (T), through the closed station loop to the ring (R), make contact PUK1–2, make contact of transfer pair C1–8 and through the lower winding of the relay.

With relay A1 released, the operate path of relay C1 is open at make contact A1–1 but relay C1 has a slow-to-release characteristic and does not immediately release. Relay L1, operated, closes at the make contact of transfer pair L1–1 an operate path for relay B1; relay B1, which has a slow-to-operate characteristic, operates after a slight delay, this operation being completed before the release of relay C1. Accordingly, a holding path for relay C1 is now closed to ground via make contacts C1–1 and B1–1 whereby relay C1 is held operated. Also, relay B1, operated, closes a HOLD path across the line from the tip side, resistor 41, make contact B1–8, the make contact of transfer pair C1–7 to the ring side of the line; relay L1 is held operated through this bridge. Relay B1, operated, closes at make contact B1–2 an activating path for interrupter INT which, however, has no function at this point, and partially closes at respective make contacts B1–6 and B1–4 the path through ringer 22 and the operate path of relay TO1. Looking inward from the calling end, Line 1 is held closed by the bridge through resistor 41 even though the subscriber goes on-hook and/or operates pick-up key PUK2 to take the call on Line 2, operation of key PUK2 resulting, of course, in release of key PUK1 and opening the station loop.

It will be understood that in the above described instance had the incoming call been on Line 2 with relays A2, C2 and pick-up key PUK2 operated and audio-video ONK switch closed, operation of HOLD key would have resulted in operations on Line 2 similar to those of Line 1 described. Relay L2 would operate and would be held operated by the bridge established through the make contact of transfer pair C2–5, make contact B2–7 and resistor 51. Relay C2 would be held operated over the path to ground via make contacts C2–1 and B2–1.

For purposes of further description, it will be assumed that with the HOLD established on Line 1 as above described (holding bridge closed through resistor 41 and relay C1 held operated), the subscriber proceeds to handle an incoming call on Line 2. He releases the HOLD key, goes on-hook to remove subset 11 from the line and closes ONK key whereby to activate combined set 12 to partially close the operate path of control relay ONR. He also at this time operates pick-up key PUK2, pick-up key PUK1 being released by this operation. Closure of Line 2 through to the video switching network follows in the manner discussed in detail above and transmission on Line 2 takes place in the normal manner while, in the meantime, the other call is "held" on Line 1.

Now when the call on Line 2 has been terminated, or placed on HOLD as above described, the HOLD on Line 1 may be removed by the subscriber in the following manner whereby to again pick-up the call on Line 1. To remove the HOLD he simply goes off-hook and operates pick-up key PUK1. The talking path is thus reestablished by closing the tip through to the station loop at make contacts PUK1–1 and SWH–1 and closing the ring at make contact PUK1–2 and the make contact of transfer pair C1–8. Relay A1 operates from ground at make contact of transfer pair SWH–2, break contact HOK–1 of the HOLD key, make contact PUK1–3, relay A1 to battery. With relay A1 operated, relay C1 holds operated to ground at make contact A1–1, relay L1 is released by the shunting path through make contact A1–2, and this is followed by release of relay B1 as the operate path is opened at the make contact of transfer pair L1–1.

Relay B1, released, opens at make contact B1–2 the activating path for interrupter INT, removes at make contact B1–8 the HOLD path on Line 1 through resistor 41, opens at make contact B1–6 the path through ringer 22 (already open at break contact C1–5), and opens at make contact B1–1 the locking path of relay C1, which relay, however, is held operated through make contact Al–1. The call on Line 1 can now be handled in the normal manner.

It will be understood that a HOLD on Line 2 may be removed by the subscriber at station A in the same general manner as that just described above. In this instance, he would operate audio-video set control key ONK and pick-up key PUK2.

A HOLD on either line, with receiver on-hook or ONK key unoperated, may be removed from the central office or the video switching network simply by a momentary line "open." Assuming, for example, Line 1, relay L1 will release when the line is opened. This will be followed by release of relay B1 as the operate path is opened at the make contact of transfer pair L1–1. Release of relay B1 is followed by release of relay C1 as the locking path is opened at make contact B1–1. (Relay A1 is in released position at this time as the operate path is open at the make contact of transfer pair SWH–2.) Line 1 is now restored to normal condition. It will be understood that a HOLD on line 2, with the ONK switch in unoperated position may be released from video switching network 52 in a manner similar to that just described.

It will be apparent from the above description of the HOLD operations that the circuit arrangement contemplated by the invention provides means whereby a HOLD bridge may be placed across either line, the pick-up key of which is closed, and that this bridge is locked across the respective line when the pick-up key of the other line is closed. The ability of the arrangement to handle simultaneous calls on both lines resulting from provision of this HOLD facility means, of course, that the overall system need not be complicated by a requirement for interchange of busy between the switching exchange and the video switching network.

Many important advantages inherent in the novel arrangement contemplated by the present invention will be immediately apparent from the above description. One of the most important advantages is that the audio-video service is made available to all customers desiring the service and willing to pay for it regardless of the type of general telephone system by which they are served for ordinary telephone purposes. This advantageous feature results, of course, from the novel provision of a separate, self-contained, switching network for exclusive handling of combined audio-video calls while the audio-only calls are handled by the normal telephone line to the local telephone exchange. Also, this "separated services" arrangement is effective to eliminate need at the subscriber's station for video supervisory signals as well as need for a distinctive ringer and/or visual signal at the station for indication of audio-video calls. Further, the novel arrangement permits use of the same directory number of a called station for both types of calls since the action at the calling end determines the routing of the call. Since, as above described, simultaneous calls can be handled on the two lines, there is no requirement for interchange of "busy" between the regular telephone switching office and the video switching network. Also, the novel number group translator provided adds substantially to the economic efficiency of the service.

While a specific embodiment of the invention has been selected for detailed disclosure, the invention is not limited in its application to the embodiments disclosed. The embodiments which have been described should be taken as illustrative rather than restrictive thereof.

What is claimed is:

1. In a combined audio-video communication system, a first telephone set at a subscriber's station for audio-only communication, number pulsing means at said first telephone set, a second telephone set at the station for combined audio-video communication, a video switching network for destination switching of audio-video calls exclusively, a first line connecting said first telephone set with a telephone switching exchange, a second line connecting said second telephone set to said video switching network, means for activating said second telephone set, means for connecting the output of said number pulsing means to said second line, means following operation of said activating means for disconnecting the output of said pulsing means from said second line and for connecting said second telephone set to said second line, a control key included in said means for activating said second telephone set, a first multi-contact pick-up key and a first control relay associated with said first line, a second multi-contact pick-up key and a second control relay associated with said second line, said pick-up keys being mechanically connected whereby operation of said first key is effective to release said second key and vice versa, the operating path of said first relay including a make contact of said first pick-up key and the operating path of said second relay including a make contact of said second pick-up key, a common path connected to said two operating paths, and parallel paths to ground connected to said common path, the first of said parallel paths including a make contact controlled by said first telephone set and the second of said parallel paths including a make contact of said control key and a break contact controlled by said first telephone set.

2. In a combined audio-video communication system, the combination defined by claim 1 further characterized in a third relay included in said disconnecting and connecting means, the operating path of said third relay including a make contact of said control key and a path to ground through a make contact of said second control relay.

3. In a combined audio-video communication system, the combination defined by claim 2 further characterized in a hold key, a break contact of said hold key being included in said common path portion connected to the operating paths of said first and said second control relays whereby operation of said hold key is effective to open said operating paths and release either of said first and second control relays which is operated.

4. In a combined audio-video communication system, the combination defined by claim 3 further characterized in a first line relay connected in said first line, a second line relay connected in said second line, an operating path for each of said line relays, a shunting path for each of said operating paths, a make contact of said first control relay connected in the shunting path for the operating path of said first line relay, and a make contact of said second control relay connected in the shunting path for the operating path of said second line relay whereby operation of either said first or said second control relay will cause release of the respective first or second line relay if such relay is in operated position.

5. In a combined audio-video communication system, a combination defined by claim 4 further characterized in a first holding bridge across said first line and a second holding bridge across said second line, a first slow release relay and a first slow operate relay associated with said first line, a second slow release relay and a second slow operate relay associated with said second line, a make contact of said respective first and second control relays included in the operate paths of said respective first and second slow release relays, a make contact of said respective first and second line relays included in the operate paths of said respective first and second slow operate relays, said first holding bridge including a resistor and respective make contacts of said first slow release relay and said first slow operate relay and said second holding bridge including a resistor and respective make contacts of said second slow release relay and said second slow operate relay whereby operation of either said first or said second slow release and slow operate relays is effective to close a respective one of said holding bridges across the associated line.

6. In a combined audio-video communication system, the combination defined by claim 5 further characterized in a locking path for said first slow release relay and a locking path for said second slow release relay, said first locking path including a make contact of said first slow release relay itself and a make contact of said first slow operate relay, and said second locking path including a make contact of said second slow release relay itself and a make contact of said second slow operate relay whereby operation of either of said slow operate relays with the respective one of said slow release relays in operated position is effective to close the locking path of that relay.

7. In a combined audio-video communication system, the combination defined by claim 6 further characterized in that the operate path of said third relay also includes a path to ground through a make contact of said second slow release relay in parallel to said path to ground through a make contact of said second control relay.

8. In a combined audio-video communication system, the combination defined by claim 7 further characterized in a marker associated with said video switching network, a number group translator also associated with said video switching network, said number group translator including a relatively large number of different possible inputs corresponding generally to directory numbers, a relatively small number of fixed outputs corresponding generally to the actual number of audio-video subscribers of the area, an electronic AND gate in each of said outputs, a relay controlled by each of said AND gates for control of respective crosspoint closures of selected line equipment corresponding to a respective audio-video service line, and cross connecting leads for connecting selected ones of said inputs to respective ones of said AND gates.

9. In a combined audio-video communication system, the combination defined by claim 7 further characterized in a first ringer associated with said first line having an operating path, a second ringer associated with said second line also having an operating path, and means effective when a respective one of said slow operate relays is operated and when the corresponding respective one of said slow release relays is non-operated for closing the operating path of a respective one of said ringers.

* * * * *